US008588824B2

(12) United States Patent
Rowe

(10) Patent No.: US 8,588,824 B2
(45) Date of Patent: Nov. 19, 2013

(54) TRANSFERRING MEDIA CONTEXT INFORMATION BASED ON PROXIMITY TO A MOBILE DEVICE

(75) Inventor: Edward R. W. Rowe, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 407 days.

(21) Appl. No.: 12/393,823

(22) Filed: Feb. 26, 2009

(65) Prior Publication Data
US 2013/0165164 A1   Jun. 27, 2013

(51) Int. Cl.
H04W 4/00 (2009.01)
H04N 7/26 (2006.01)
H04B 7/00 (2006.01)

(52) U.S. Cl.
USPC .............. 455/466; 455/41.2; 386/231

(58) Field of Classification Search
USPC .......... 455/466, 414.3, 418, 67.1, 419; 348/625; 370/312, 389, 352; 379/91.02; 706/12; 709/223, 227; 713/159, 193; 715/753; 710/62
See application file for complete search history.

(56) References Cited

U.S. PATENT DOCUMENTS

| | | | |
|---|---|---|---|
| 7,408,460 B2 | 8/2008 | Crystal et al. | |
| 7,659,820 B2 | 2/2010 | Schnee et al. | |
| 7,848,521 B2* | 12/2010 | Leporini et al. | 380/241 |
| 8,026,805 B1 | 9/2011 | Rowe | |
| 8,327,277 B2* | 12/2012 | Thakkar et al. | 715/753 |
| 2003/0182579 A1* | 9/2003 | Leporini et al. | 713/201 |
| 2005/0198029 A1* | 9/2005 | Pohja et al. | 707/8 |
| 2006/0104266 A1* | 5/2006 | Pelletier et al. | 370/389 |
| 2007/0076309 A1 | 4/2007 | Shimizu et al. | |
| 2007/0095905 A1 | 5/2007 | Kadaba | |
| 2007/0157304 A1 | 7/2007 | Logan et al. | |
| 2007/0234048 A1* | 10/2007 | Ziv | 713/159 |
| 2008/0091722 A1* | 4/2008 | Wendelrup | 707/104.1 |
| 2008/0183645 A1* | 7/2008 | Burger et al. | 706/12 |
| 2008/0200154 A1* | 8/2008 | Maharajh et al. | 455/414.3 |
| 2009/0043754 A1* | 2/2009 | Faris et al. | 707/5 |
| 2009/0268655 A1* | 10/2009 | Bertz et al. | 370/312 |
| 2010/0293187 A1* | 11/2010 | Biehn et al. | 707/769 |
| 2011/0173235 A1* | 7/2011 | Aman et al. | 707/792 |

OTHER PUBLICATIONS

"iPod Your BMW," Apple Press Release [online], Jun. 21, 2004. Retrieved from the Internet: <URL: http://www.apple.com/pr/library/2004/jun/21bmw.html>, [retrieved on Apr. 9, 2009], 1 page.

(Continued)

Primary Examiner — Meless N Zewdu
Assistant Examiner — Jean Chang
(74) Attorney, Agent, or Firm — Wolfe-SBMC

(57) ABSTRACT

Methods, systems, and apparatus, including computer program products, for transitioning the playing of content between devices. In some implementations, a method includes receiving a first notification; receiving media context information identifying media content played by a first player device; associating the media context information with a mobile device; receiving a second notification, and in response to receiving the second notification, instructing a second player device to begin playing media content. Capability information indicating types of content that the second player can play can be received. The second player can be instructed to play the media content identified in the media context information beginning at a location specified in the media context information or to play second media content related to the identified media content where the second media content has a type that can be played by the second player device.

27 Claims, 6 Drawing Sheets

(56) References Cited

OTHER PUBLICATIONS

"RadioBookmark.com: Home page," [online]. Retrieved from the Internet: <URL: http://www.radiobookmark.com/>, [retrieved on Apr. 9, 2009], 2 pages.

"RadioBookmark.com: Learn More," [online]. Retrieved from the Internet: <URL: http://www.radiobookmark.com/static/learn_more>, [retrieved on Apr. 9, 2009], 7 page.

"Slingbox Solo—Features," [online]. Retrieved from the Internet: <URL: http://www.slingmedia.com/go/slingbox-solo-slingplayer>, [retrieved on Apr. 9, 2009], 1 page.

Ricker, Thomas, "Apple's Remote: turns your iPhone into a WiFi remote control," Engadget [online], Jul. 10, 2008. Retrieved from the Internet: <URL: http://www.engadget.com/2008/07/10/apples-remote-control-application-for-itunes-and-apple-tv/>, [retrieved on Apr. 9, 2009], 6 pages.

McCarthy, Caroline, "Deutschlanders: E-mail Google Maps to your BMW," CNET News [online], Mar. 8, 2007. Retrieved from the Internet: <http://news.cnet.com/8301-17939_109-9695148-2.html>, [retrieved on Apr. 9, 2009], 2 pages.

"Beo5 Guide," Bang & Olufsen product guide [online]. Retrieved from the Internet: <http://www.bang-olufsen.com/UserFiles/File/ug/Beo5/Beo5_English.pdf>, [retrieved on Apr. 19, 2009], 24 pages.

\* cited by examiner

TRANSFERRING MEDIA CONTEXT INFORMATION BASED ON PROXIMITY TO A MOBILE DEVICE

BACKGROUND

This specification relates to the transfer of media context information between media content players.

A typical individual consumes various media content from various players during any given day. For example, an individual might wake up in the morning and watch the news on a television, get in a car to drive to work and listen to a radio news program on the car radio, get into work and listen to an Internet radio station over a computer, and get home from work and watch recorded television from a digital video recorder (DVR).

The variety of media content consumed by an individual is sometimes driven by the difficulty in maintaining content consistency across players. For example, if an individual was watching a football game on television and then wanted to continue listening to the game in the car, the individual would have to spend time listening to various radio stations until the individual found the appropriate channel. As another example, if an individual watched part of a movie over the Internet at a friend's house, drove home, and wanted to finish watching the movie at home, the individual would have to instruct a computer to navigate to the website where the video was hosted, and would then have to attempt to find the location where the individual left off in the movie.

SUMMARY

This specification describes technologies relating to using a mobile device in the transfer of media context information.

In general, one aspect of the subject matter described in this specification can be embodied in a method that includes the acts of receiving a first notification indicating that a mobile device is in range of a first player device, where the mobile device is distinct from the first player device; receiving media context information, where the media context information identifies media content currently being played by the first player device, where the media content has a timeline, and the media context information specifies a current location in the timeline; associating the media context information with the mobile device; receiving a second notification indicating that the mobile device is in range of a second player device, where the second player device is distinct from the first player device and the mobile device; and in response to receiving the second notification, instructing the second player device to begin playing the media content identified in the media context information associated with the mobile device starting from the current location in the timeline. Other implementations include corresponding systems, apparatus, computer program products, and computer storage media.

These and other implementations can optionally include one or more of the following features. Media context information can periodically be received from the first player device while the mobile device is in range of the first player device. Context information can be received from the first player device according to a period based on the media content.

The media content can be live content, the media content can be recorded for playback at a later time, and the recorded media content can be sent to the second player device.

Instructing the second player device to begin playing the media content can include sending instructions to the second player device through the mobile device.

Media content can be selected from the group consisting of movies, television shows, videos, radio broadcasts, picture slideshows, audio files, music recordings, or video games.

In general, another aspect of the subject matter described in this specification can be embodied in a method that includes the acts of receiving a first notification indicating that a mobile device is in range of a first player device, where the mobile device is distinct from the first player device; receiving first media context information from the first player device, where the first media context information identifies first media content currently being played by the first player device, and where the first media content has a first content type; associating the first media context information with the mobile device; receiving a second notification indicating that the mobile device is in range of a second player device, where the second player device is distinct from the first player device and the mobile device; receiving capability information about the second player device, where the capability information specifies one or more types of media content that can be played by the second player device, and where the first content type is not one of the one or more types of media content that can be played by the second player device; identifying second media content related to the first media content, where the second media content has a second content type, and where the second content type is one of the one or more types specified by the capability information; and instructing the second player device to play the second media content. Other implementations include corresponding systems, apparatus, computer program products, and computer storage media.

These and other implementations can optionally include one or more of the following features. The first and second media content can be played according to a respective timeline, the first media context information can specify a current location relative to the timeline for the first media content, a second location corresponding to the current location can be identified based on a mapping of the first media content to the second media content; and instructing the second player device to play the second media content can include instructing the second player device to play the second media content starting from the second location.

Media context information can be periodically received from the first player device while the mobile device is in range of the first player device. Context information can be received from the first player device according to a period based on the media content.

Identifying the second media content can comprise retrieving the second media content from a database associating two or more media contents, each media content having a different type. Identifying the second media content can include analyzing data for one or more sources of content, and identifying second media content being broadcast by one of the sources of content, where the second media content is related to the first media content. The second media content can be related to the first media content when at least one of the following conditions is met: the first media content and the second media content provide information on the same event; or the first media content and the second media content are related content as determined from user preference data.

Instructing the second player device to begin playing the second media content can include sending instructions to the second player device through the mobile device.

Particular embodiments of the subject matter described in this specification can be implemented to realize one or more of the following advantages. A user can seamlessly transition from playing content on one device to playing content on another device, without having to directly interact with either device. When one device is not capable of playing the content, related content can be identified.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
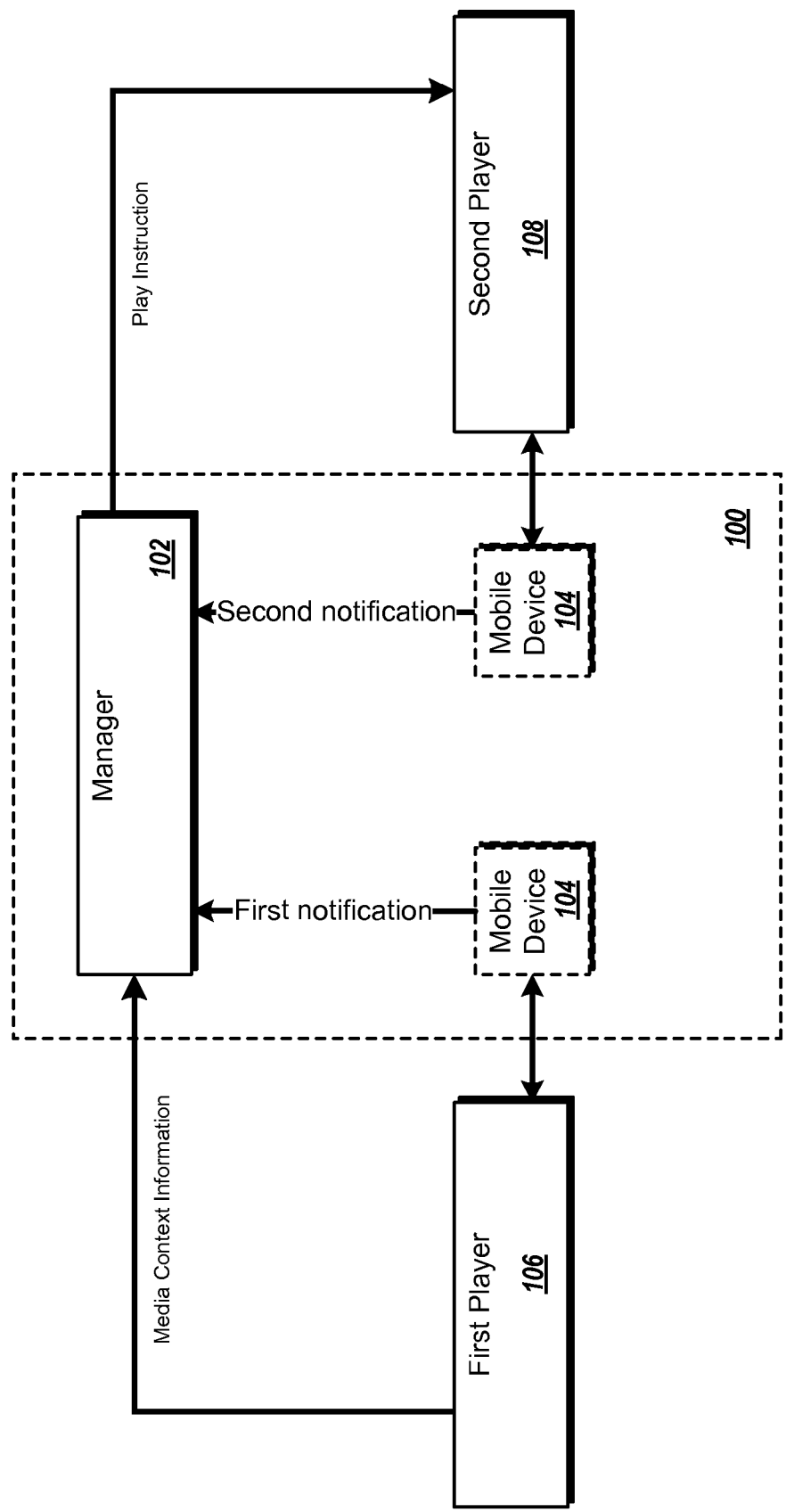
FIG. 1 illustrates example interactions between a first player, a second player, and a system including a manager and a mobile device.

FIG. 1 illustrates example interactions between a first player 106, a second player 108, and a system 100 including a manager 102 and a mobile device 104.

Generally speaking, the first player 106, the second player 108, the manager 102, and the mobile device 104 communicate with each other through a network or a direct connection. Examples of networks include the Internet, cellular networks, and satellite networks. Direct connections can be wireless or wired. Examples of wireless connections include Bluetooth™ based connections, wi-fi based connections, infrared based connections, ultra wideband based connections, z-wave based connections, and ZigBee™ based connections. Examples of wired connections include data cables or computer buses.

The first and second players 106 and 108 are able to play media content. Generally speaking, media content is data that can be played according to a timeline. Media content can be live or prerecorded. Examples of media content include recordings or live broadcasts of movies, television shows, videos, radio broadcasts, photo slideshows, audio, music recordings, and interactive media such as interactive video games. Examples of the first and second players include digital video recorders, radios, televisions, computers, portable media players such as portable video players and portable music players, electronic game systems, mobile phones, and cameras. In some implementations, the players can receive and respond to instructions sent by the manager 102. Each player can be a player device.

The media content can come from any of a variety of sources. For example, the media content can be stored on a player or can be streamed or copied from another device, e.g., the first and second players 106 and 108, the mobile device 104, or another device such as a network server. Media content is copied to a player, for example, when it is stored in its entirety on the player. Media content is streamed to a player, for example, when it is transferred in real-time as the player is playing the media content.

The mobile device 104 is a portable device, e.g., one that is carried by a user, and can be associated with the user. The mobile device is configured to communicate with one or more players or a manager, as described above. In some implementations, the mobile device can also perform actions including sending and receiving phone calls, sending and receiving digital data, storing content, and presenting content, e.g., playing media content. Examples of mobile devices include cell phones, pagers, personal digital assistants, and a Universal Serial Bus (USB) flash drive, such as a jump drive. Mobile devices can also be wearable devices, such as a buttons or necklaces, that are configured to communicate with one or more players or a manager.

The mobile device 104 can be moved between players so that it is in range of the first player 106 or the second player 108. The double headed arrows in FIG. 1 indicate that a mobile device is in range of a given player.

Figure 2:
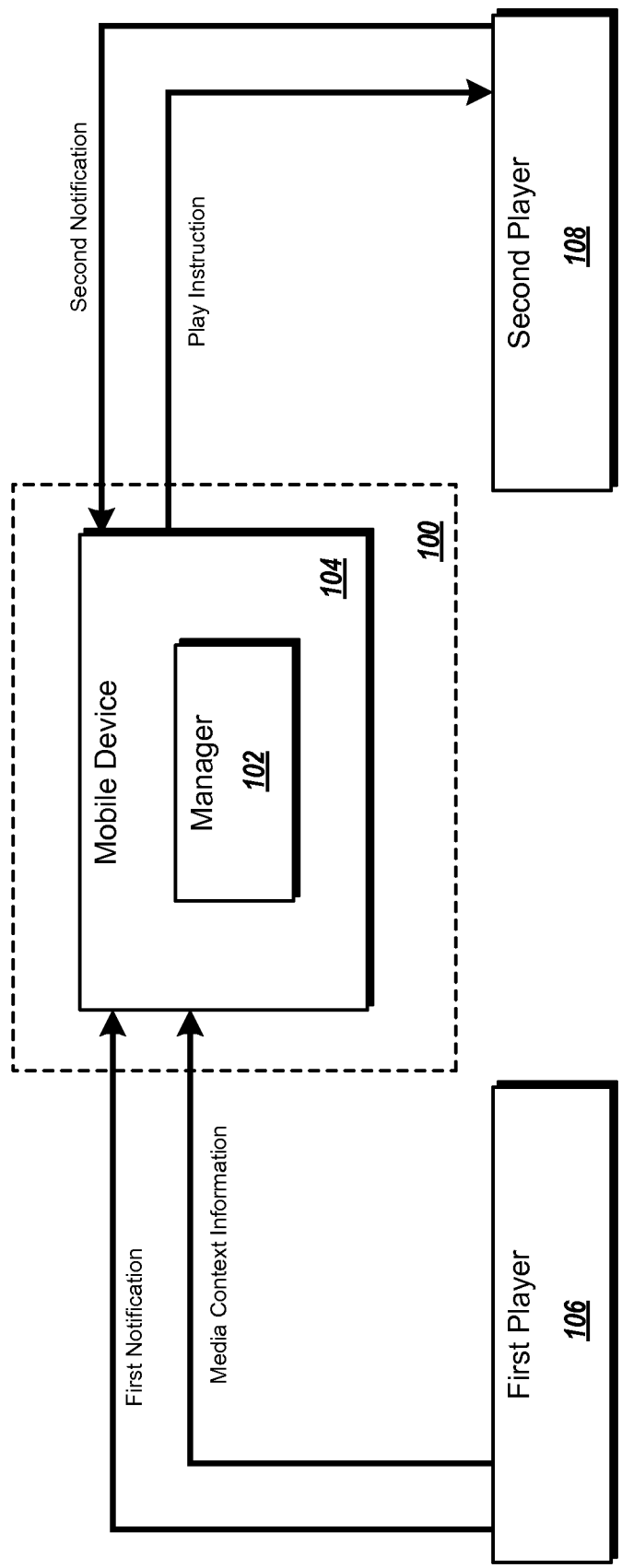
FIG. 2 illustrates example interactions between a first player, a second player, and a system including a mobile device that includes a manager.

The manager 102 can be part of one or more of the mobile device, the first player, and the second player, or can be a separate entity. For example, FIG. 2 illustrates example interactions between a first player 106, a second player 108, and a system 100 made up of a mobile device 104 that includes a manager 102.

Referring to FIG. 1, the manager 102 tracks which players are in a vicinity of a mobile device 104 based on notifications the manager 102 receives when the mobile device 104 is in range of a player. The manager 102 can receive the notification from the mobile device 104, a player, or another device, such as a cell phone network server. The manager 102 can also generate the notification based on other information the manager 102 receives.

Two devices are in range when they are within a certain distance of each other. In some implementations, the distance is defined to be the maximum distance over which the two devices can communicate. For example, if the mobile device and a player communicate using a Bluetooth™ protocol, then the distance could be the maximum distance over which the two devices could communicate using a Bluetooth™ protocol. In some implementations, the distance is separately defined for each player, based on how a user typically interacts with a player. For example, the distance could be defined as the maximum distance a user could be from the player and still experience the media played by the player. For a car radio, the distance could be defined to include only the car's interior. For a television, the distance could be defined to be the furthest distance that a typical user could sit from the television and still see the content. The distance could also be defined as a typical distance a user is from the player while content from the device is being consumed. For example, for a television of a certain size, the distance could be the recommended distance that a viewer sit from a television of that size. For a portable DVD player, the distance could be a typical user's arm length, so as to allow the user to still reach and control the player. In some implementations, the distance is defined to be the same for all players, for example, by choosing the maximum, minimum, or average distance for a set of potential devices. In some implementations, the distance is based on a geographical location. For example, if the mobile device is in the same room as the player, or alternatively, the same building as the player, the two can be considered to be in range. In some implementations, the distance is user-defined. For example, a user can provide feedback indicating that the mobile device is in range of the player and a notification should be sent.

In some implementations a given player must be turned on for the mobile device to be in range of it.

The mobile device 104 and/or a given player can determine that they are in range, for example, by exchanging information according to a Bluetooth™ protocol. If the two devices are close enough to communicate, they can be deemed to be in range of each other. In some implementations, a player broadcasts a notification indicating that it is accessible. The mobile device 104 can receive this notification and determine that it is in range of the player. In some implementations, the mobile device 104 broadcasts a notification indicating that it is accessible. A player device can receive this notification and determine that it is in range of the mobile device 104.

The manager 102 or another device can determine that the mobile device 104 is in range of a given player based on notifications indicating the location of the two devices from either the individual devices or another device, such as a cell phone network server. For example, the manager 102 (or the other device) can receive global positioning system (GPS) data or triangulation data (e.g., from one or more cell phone towers in the vicinity of the mobile device and the given device). The manager 102 (or the other device) can then compare the locations of the mobile device and the given player to determine if the two are in range.

The manager 102 also receives media context information from one or more players. Media context information provides information about media content currently being played on the player. The media context information can identify the media content currently being played as well as a location in the media content. The media context information can also identify additional information about the media content currently being played, such as the type of content (e.g., video, audio, television, photographs, documents, DVD, etc.) and the category of the content (e.g., country music, television comedy, drama, etc.).

The identifier of the media content currently being played can be a globally unique identifier or a local identifier unique to the user associated with the mobile device. A globally unique identifier can be, for example, a universal resource locator (URL) for content being streamed over the Internet, an identifier stored within the media, or an identifier generated from the media, for example, by generating a hash value from the media data. A local identifier can be a local identifier unique to the user associated with the mobile device, for example, a path to a file stored on the manager. The current location is data indicating how much of the content has been played by the player, e.g., data indicating where the player is in the timeline associated with the media content. The current location may reflect an offset from the actual location where the player is in the timeline associated with the media content. The current location may also indicate the current state of the content being played, for example, the current state of a video game. The current location can be a direct location, for example, for content such as videos and music, the current location could be an elapsed time into the video or music, and for content such as a picture slideshow, the current location could be the current picture being viewed. The current location can also be an indirect measure of location. For example, the current location could be a piece of the content played by the player or an identifier created by generating a hash value from the last part of the content. In some implementations, common elements such as white noise for audio files and black screens for video files are not included in the indirect measure of location.

The manager 102 can also receive capability information about a given player, for example, indicating what types of media content can be played on the player.

In some implementations, the manager 102, mobile device 104, first player 106, and second player 108 generally interact as follows. The mobile device 104 and the first player 106 can come in range of each other. The manager 102 can receive a first notification indicating that the mobile device 104 is in range of the first player 106. The manager 102 can then receive media context information from the first player 106. The manager 102 can then associate the media context information with the mobile device 104.

In some scenarios, the first player 106 and the mobile device 104 may subsequently fall out of range. This can occur when the user carries the mobile device away from the first player, such as when a user walks away from a television and has a cell phone in the user's pocket.

The mobile device 104 may then come in range of a second player 108. The manager 102 receives a second notification. The second notification indicates that the mobile device 104 is now in range of a second player 108.

In response to receiving the second notification, the manager 102 instructs the second player 108 to play media content. In some implementations, the media content is the media content identified in the media context information associated with the mobile device, and the manager 102 instructs the second player to play the media content starting from the current location identified in the media context information. In alternative implementations, the media content is media content related to the media content identified in the context information associated with the mobile device.

Figure 3:
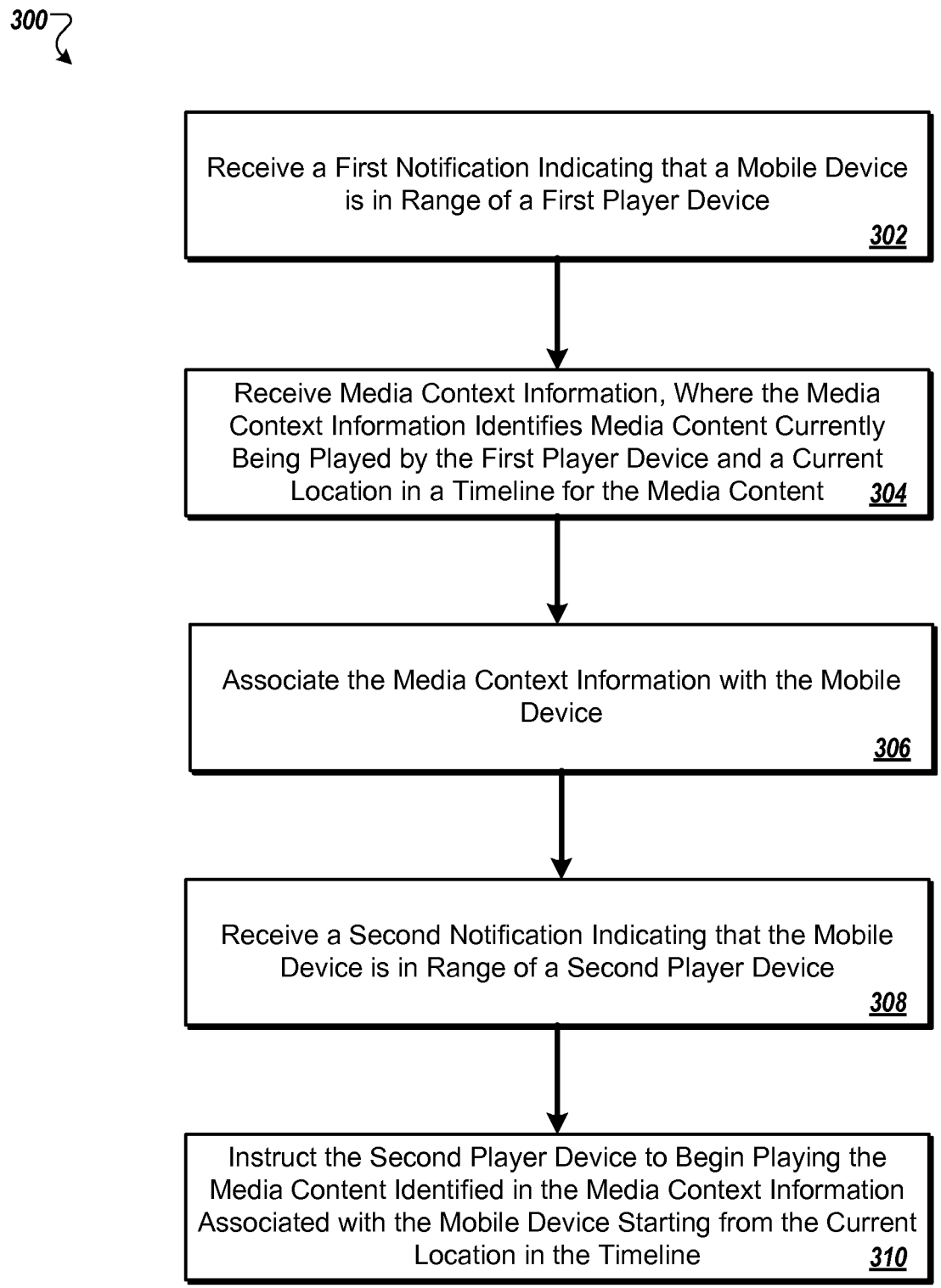
FIG. 3 illustrates an example method for receiving media context information and instructing a player based on the media context information.

FIG. 3 illustrates an example method for receiving media context information and instructing a player based on the media context information. The method can be performed by a manager, such as a manager device.

A first notification indicating that a mobile device is in range of a first player is received (step 302). The first notification can be received as described above in reference to FIG. 1.

Media context information is received (step 304). The media context information identifies media content currently being played by the first player device and also identifies a current location in the timeline for the media being played, for example, as described above in reference to FIG. 1.

The media context information is associated with the mobile device (step 306). In some implementations, associating the media context information with the mobile device includes determining an identifier for the mobile device. The identifier can be received from the mobile device or generated by or for the manager. For example, the identifier can be based on the Media Access Control address (MAC address) or physical address of the mobile device, or other identifying information about the mobile device. For example, if the mobile device is a phone, a unique identifier can be generated based on the telephone number associated with the phone. If the mobile device has a SIM card, the identifier can be generated based on information stored on the SIM card, for example, based on the International Mobile Subscriber Identity (IMSI) or Integrated Circuit Card Identifier (ICCID) of the SIM card.

A second notification indicating that the mobile device is in range of a second player is received (step 308). The second notification can be received as described above in reference to FIG. 1. In some implementations second notifications are received from multiple players. When this happens, the second player can be chosen from the multiple players, for example, by choosing the player according to a user-specified preference (e.g., specified in advance, or at the time multiple players are detected), by choosing the player that is geographically closest to the mobile device, or by choosing the player that can play the most types of content.

The second player is instructed to begin playing the media content identified in the media context information associated with the mobile device starting from the current location in the timeline (step 310).

In some implementations, the media context information is received either directly or indirectly from the first player. In some implementations, the media context information is received through the mobile device. For example, first player can send the media context information to the mobile device. The mobile device can then send the media context information to the manager on behalf of the first player.

In some implementations, media context information is received periodically, while the mobile device is still in range of the first player. The period can be regular, for example, every 30 seconds, every minute, every five minutes, etc, or can be irregular. The period can be determined by the type of media content being played on the first player. Various types of content typically have different lengths. For example, a music song is generally three or four minutes long, while a television program can be thirty minutes to an hour long. Context information can be sent more frequently for media content with a shorter length, to ensure that the information about what is being played, as well as the current location in what is being played, is accurate. The period could also be based on natural breaks in the media content being presented. For example, if the media content is a recorded movie such as a DVD, a natural place to break could be chapters on the DVD, and thus the media context information could be sent at every chapter. If the media content is a television program, a natural place to break could be at commercial breaks, and thus the media context information could be sent at the beginning or the end of each commercial break. If the media content is a video, a natural place to break could be every time a scene in the video changed, and thus the media context information could be sent at every scene change. The period can also be determined based on the movement of the mobile device (e.g., the rate or direction of movement of the mobile device). For example, the period could be shorter when the mobile device is moving rapidly away from the first player. The rate and direction can be determined, for example, using accelerometer data from an accelerometer on the mobile device or using GPS data tracking the location of the mobile device over time.

In some implementations, the mobile device is assumed to be in range of the first player until an out-of-range notification is received. An out-of-range notification indicates that the two devices are no longer in range. The out-of-range notification can be received much as a notification that the two devices are in range can be received, after the conditions that led the notification that the two devices are in range to be received are no longer true. For example, if two devices are considered to be in range while they are within a certain distance, the out of range notification could be sent once the two devices are no longer within that distance (for example, when a Bluetooth™ connection between the mobile device and the first player is lost, or when the location of the two devices is too far apart).

In some implementations, media context information is received from the first player when the first player and the mobile device are almost out of range. For example, if the distance between the two devices (as measured based on their location) approaches the maximum distance for two devices to be considered in range, e.g., when the distance approaches a given threshold, then the two devices can be deemed almost out of range. The location of the two devices can be determined, for example, using GPS. As another example, if the mobile device and the first player are connected, when the connection begins to weaken (for example, when the Bluetooth™ signal fades), the two devices could be deemed almost out of range. As yet another example, the two devices can be deemed to be almost out of range based on the movement of the mobile device. For example, if the mobile device moves rapidly (for example, when a person carrying the mobile device stands up), the two devices could be deemed to be almost out of range based on the movement of the mobile device. If the mobile device is moving away from the player and the signal strength is weak, the two devices could be determined to be almost out of range. The movement of the mobile device can be determined, for example, using accelerometer data or GPS data.

The manager can directly instruct the second player device to begin playing media content, or can send instructions through another device. For example, the manager can send the instruction to the mobile device, and the mobile device can send the instruction to the second player. The instruction can specify a direct measure of location (e.g., an elapsed time), an indirect measure of location, such as a part of the media content data or an identifier generated from the part of the media content data, or a direct measure of location calculated from an indirect measure of location. A direct measure of location can be calculated from an indirect measure of location, for example, by matching the data identified in the indirect measure of location to a specific location in the media content. In some implementations, the indirect location may include multiple data samples. The multiple data samples can be used, for example, to identify a specific location when the first sample matches multiple points in the media content.

The media content identified in the media context information can be stored on various devices. In some implementations, the media content is stored on the first player. In some implementations, the media content is stored on one or more of the manager, the second player, the mobile device, or another device (e.g., a web server hosting media content), and whichever device stores the content can copy or stream it to the second player.

In some implementations, the manager receives the media content identified in the media context information from the first player, either directly or indirectly.

In some implementations, the media content is live, and the manager records it for later playback. Later playback can include streaming the recorded content to the second player device.

Figure 4:
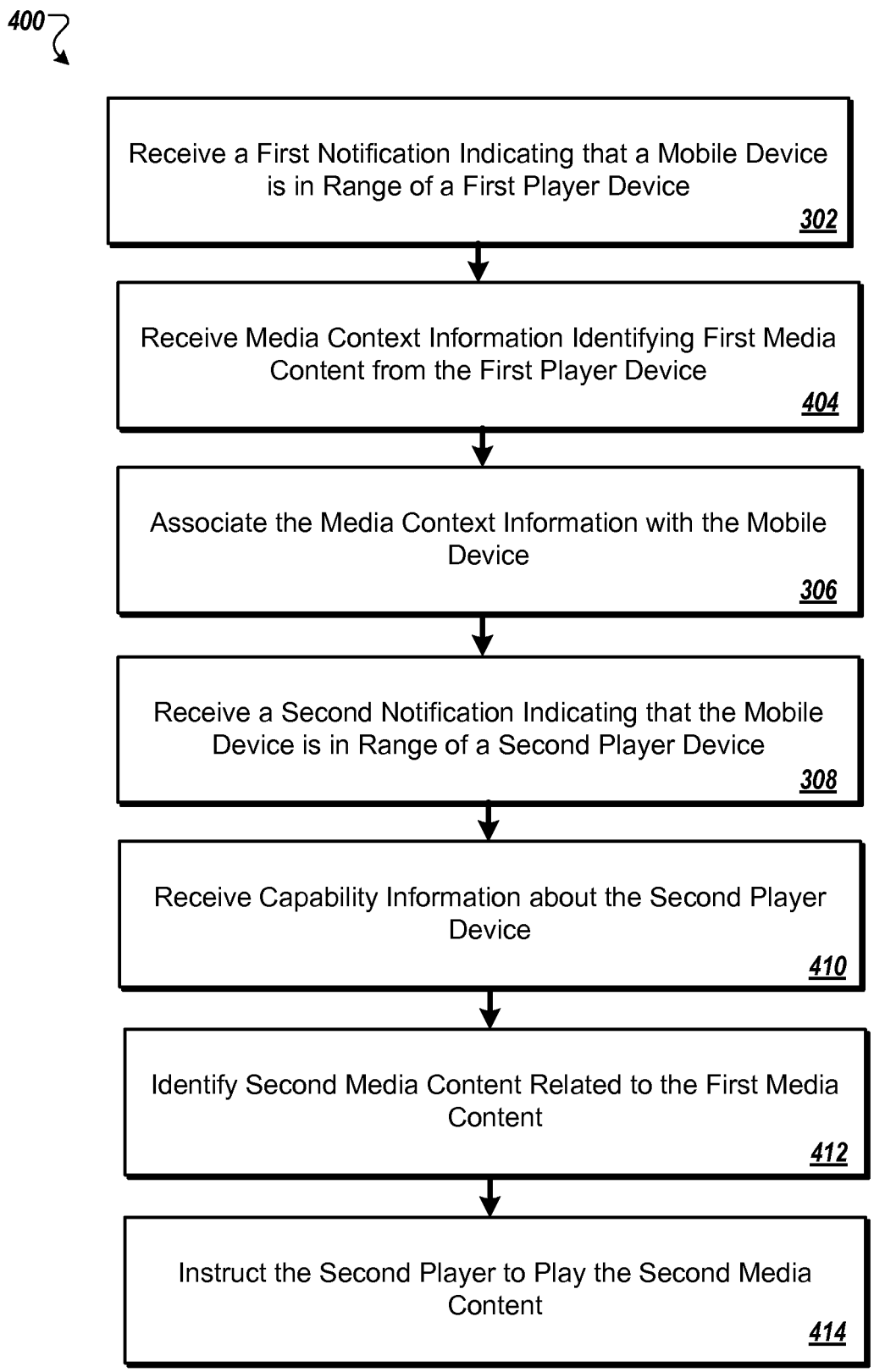
FIG. 4 illustrates an example method for receiving media context information from one player, identifying related media content, and instructing a second player to play related media content.

FIG. 4 illustrates an example method for receiving media context information from one player, identifying related media content, and instructing a second player to play related media content. The method can be performed by a manager, such as a manager device.

A first notification indicating that a mobile device is in range of a first player is received (step 302), as described above in reference to FIG. 3.

Media context information is received from the first player (step 404). The media context information can be received as described above in reference to FIG. 3. The media context information specifies information about first media content being played by the first player, as described above in reference to FIGS. 1 and 2. The first media content information has a type. The media context information can specify the type of the first media content.

The media context type indicates how the media content is experienced by a user. Each type of media content can have one or more aspects. Each aspect describes part of how the content is experience by a user. For example, video type content has visual and audio aspects, while audio type content has just an audio aspect. The media context type can also specify additional user options provided by the content, for example, closed captions or audio available in multiple languages. The media context type can also indicate further information on the category of the content, for example, television content, amateur video content, professional movie content, radio broadcast, etc.

The media context information is associated with the mobile device (step 306), as described above in reference to FIG. 3.

A second notification indicating that the mobile device is in range of a second player is received (step 308), as described above in reference to FIG. 3.

Capability information about the second player is received (step 410). Generally speaking, capability information provides information on what media content a given player can play. For example, the capability information can include information on how a given player can create a connection with other devices and can also specify one or more types of media content that can be played by the given player. In some implementations, a type of media content can be played by a given player if all of its aspects can be played by the given player. For example, if the media content type is video (having audio and visual aspects), the given player would have to be able to play both the visual aspects of the video and the audio aspects of a video for the video type to be included. If the given player is a radio, it would be capable of playing audio, but not video files, because while a radio does have speakers, it does not have a screen. Thus, the capability information for a radio could include a type for audio files but not video files. In some implementations, a type of media content can be played on the given player if some of its aspects can be played by the given player. For example, if the media content type is a video, the given player would only have to be able to play either the visual aspects or the audio aspects of the video for the video type to be included. In this implementation, the radio would be capable of playing the video type.

When the types of media content specified by the capability information for the second player do not include the type of the first media content, related media content needs to be identified because the second player will not be able to play the first media content (or not be able to play all aspects of the first media content).

Second media content related to the first media content is identified in response to the second notification (step 412). The type of the second media content is included in the types of media content that can be played by the second player. This means that the second media content can be played by the second player.

The first and second media content can be considered related when a user would consider one an acceptable substitute for the other. Various measures of relatedness are possible. For example, two pieces of content can be related if they provide information on the same event. For example, a television broadcast of a football game and a radio broadcast of the same football game could be considered similar. Two pieces of content can also be related as determined from user preference data. User preference data includes information received from users about whether or not two given pieces of media content are related. This data can be compiled and stored, e.g., in a database, and then used to create a measure of similarity between two pieces of content. Two pieces of content whose similarity score is above a given threshold can be deemed similar. The threshold can be determined empirically. Two pieces of content can also be related, for example, when they are about the same topic, involve the same talent (e.g., when they have the same actors or directors), are from the same era, are from the same genre, or when they are from the same series (e.g., when they are two different episodes from the same television series). Two pieces of content can also be related when they are different versions of the same source content, for example, a television show of a radio broadcast and the radio broadcast itself.

In some implementations, the media context information includes a current location indicating where the first player is in the media content's timeline. The current location can be mapped to a second location corresponding to the second media content. The mapping is sometimes necessary, because the appropriate location does not directly correlate across media contents. For example, if the first media content includes commercials and the second media content does not include commercials, then the first current location, e.g., elapsed time in the first media content, is larger than the second current location should be, because it includes time spent playing commercials that do not exist on the second media content. As another example, if the first media content is a video and the second media content is a picture slideshow, the elapsed time in the video does not directly indicate which picture is being viewed. Mapping can be done by retrieving mapping information from a database. The mapping information could specify, for example, an offset between the current location in the first and second media contents, or a formula for converting between the two locations. For example, in the video to picture slideshow example, if the pictures are shown in the video with regular frequency, the formula could be the current location in the video (e.g., elapsed time) divided by the amount of time spent showing each picture.

The second player is instructed to play the second media content (step 414). The second player can be instructed, for example, as described above in reference to FIG. 3.

In some implementations, the capability information is received either directly or indirectly from the second player. In some implementations, the capability information is received from another device. In some implementations, the capability information is received from a database, for example stored on the manager, where the database associates particular devices with particular capability information. The database could associate specific models of devices with capability information, or associate generic classes of devices with capability information. In some implementations, the capability information is part of the notification.

In some implementations, the second media content is identified by looking the first media content up in a database and retrieving related media content with a type that can be played on the second player. In some implementations, the second media content is identified by analyzing data about various sources of media content (e.g., sources who provide media content of a type that can be played by the second device). Sources of media content include sources such as television stations, radio stations, internet radio stations, and other sources that provide content to users. For example, when the second media content is a radio broadcast, the second media content can be identified by analyzing radio broadcast data system information for one or more radio stations. Generally speaking, radio broadcast data system information is data sent, e.g., by a radio station, according to the Radio Broadcast Data System protocol. The data can include, for example, an identification of the radio station, the call letters or station name of the radio station, the genre of programming provided on the radio station (e.g., News, Rock, etc.), and a description of what is currently being played on the radio. This information can be analyzed to identify stations of the same genre as the first media content or covering the same event as the first media content, for example, by parsing the text of the data and identifying relevant words and phrases. For example, if the first media content is a football game featuring the Dallas Cowboys football team, the radio broadcast data system information could be analyzed to identify a radio station playing content with a genre of "sports" or stations playing content whose description includes "football" or "Dallas Cowboys". As another example, when the second media content is a television broadcast, the second media content can be identified by analyzing television listings information for information such as which station is playing a program, the title of the program, the year the program was created, the genre of the program, and who the main actors are. As yet another example, when the second media content is an Internet radio station, the second media content can be identified by analyzing Internet radio listings information, much as the radio broadcast data information or television listings information is analyzed.

In some implementations, the media context information received from the first player further includes a description of the content, for example, "football, Dallas Cowboys, channel 4." This description can be used to direct the search.

Figure 5:
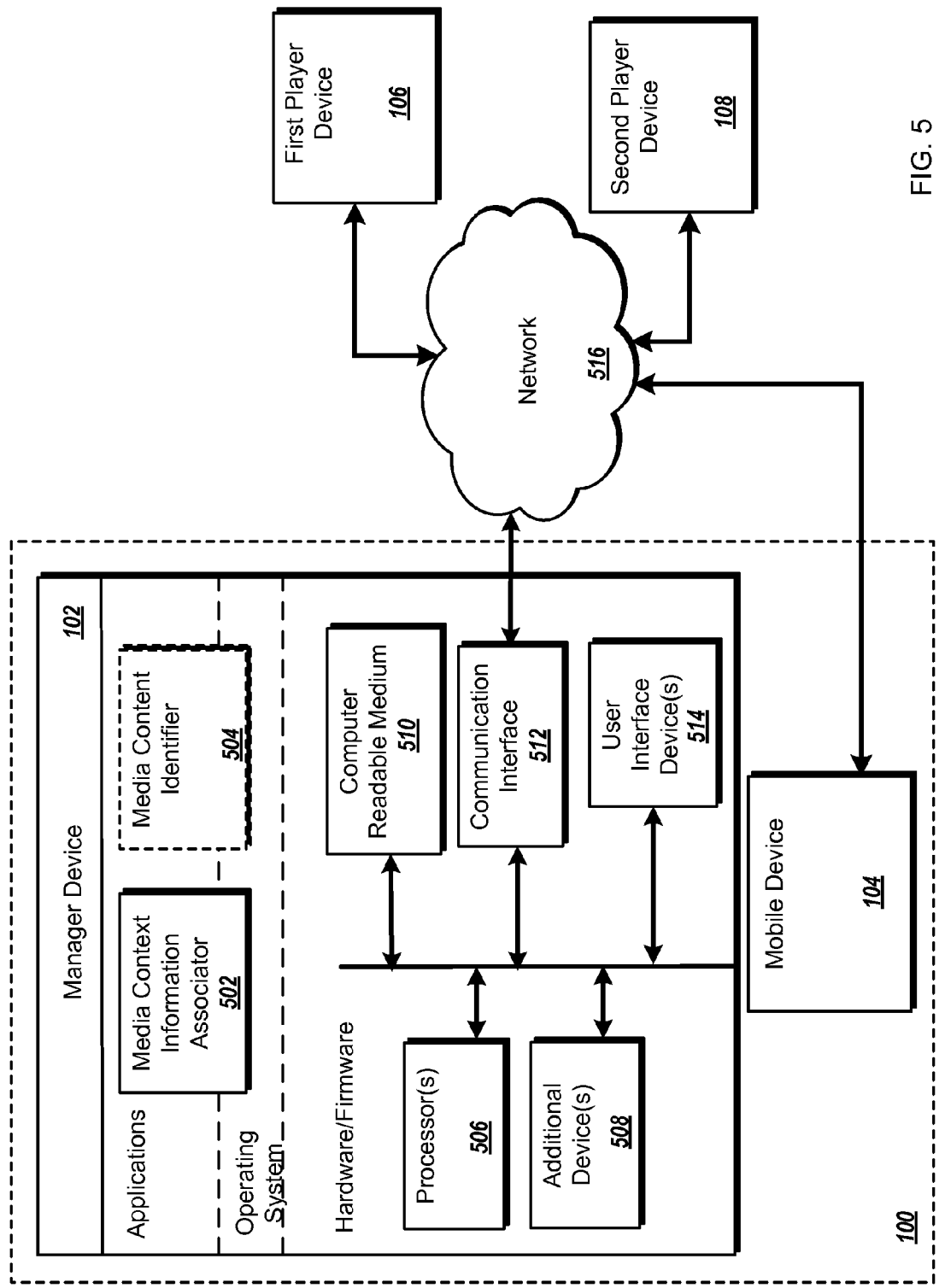
FIG. 5 illustrates an example architecture of a system including a manager device and a mobile device.

FIG. 5 illustrates an example architecture of a system 100 including a manager device 102 and a mobile device 104. One or more of the manager device 102, mobile device 104, first player device 106, and second player device 108 are connected through a network 516 or a series of direct connections between devices.

The manager device 102 is a data processing apparatus. While only one data processing apparatus is shown in FIG. 5, a plurality of data processing apparatus may be used. The components of the manager device may be on one or more of the mobile device 104, the first player device 106, or the second player device 108, or may be separate from those devices.

The manager device 102 includes various modules, e.g., processes or executable software programs. These modules include a media context information associator 502 and an optional media content identifier 504.

The media context information associator module 502 creates an association between received media context information and a mobile device, as described above in reference to FIG. 3. The media context information associator 502 can also generate an identifier for the mobile device, for example, based on information about the device.

The media content identifier module 504 identifies second media content related to first media content identified in the media context information associated with the mobile device. The second media content can be identified, for example, as described above in reference to FIG. 4.

In some implementations, the manager device 102 stores media context information, associations between media context information and mobile devices, media content, and/or one or more databases associating media content of various types. In some implementations, this data is stored on a computer readable medium 510. In some implementations, this data is stored on one or more additional devices 512, for example, a hard drive.

The manager device 102 also has hardware or firmware devices including one or more processors 506, one or more additional devices 508, computer readable medium 510, and one or more user interface devices 514. User interface devices 514 include, for example, a display, a camera, a speaker, a microphone, or a tactile feedback device.

The manager device 102 uses its communication interface 512 to communicate with one or more of a mobile device 104, a first player device 106, and a second player device 108 through a network 516. For example, the manager device 102 can receive notifications through its communication interface, receive media context information through its communication interface, and send play instructions to players through its communications interface. The manager device 102 can also receive capability information through its communications interface.

The mobile device 104 is a data processing apparatus. The mobile device 104 is configured to communicate with one or more of the manager device 102, the first player device 106, and the second player device 108. The mobile device 104 may also be configured to communicate with other devices not pictured. In some implementations, the mobile device is configured to copy or stream content to or from another device. In some implementations, the mobile device is configured to play media content.

The first player and second player, 106 and 108, are data processing apparatus. While only one data processing apparatus is shown for the each player, multiple data processing apparatus can be used. The two players are each configured to play media content. The two players may be configured to communicate with one or more of the manager device 102, the mobile device 104, the first player device 106, and the second player device 108 The two players may also be configured to communicate with other devices not pictured. In some implementations, the players are also configured to copy and stream media content to and from each other, the manager device, or the mobile device.

Figure 6:
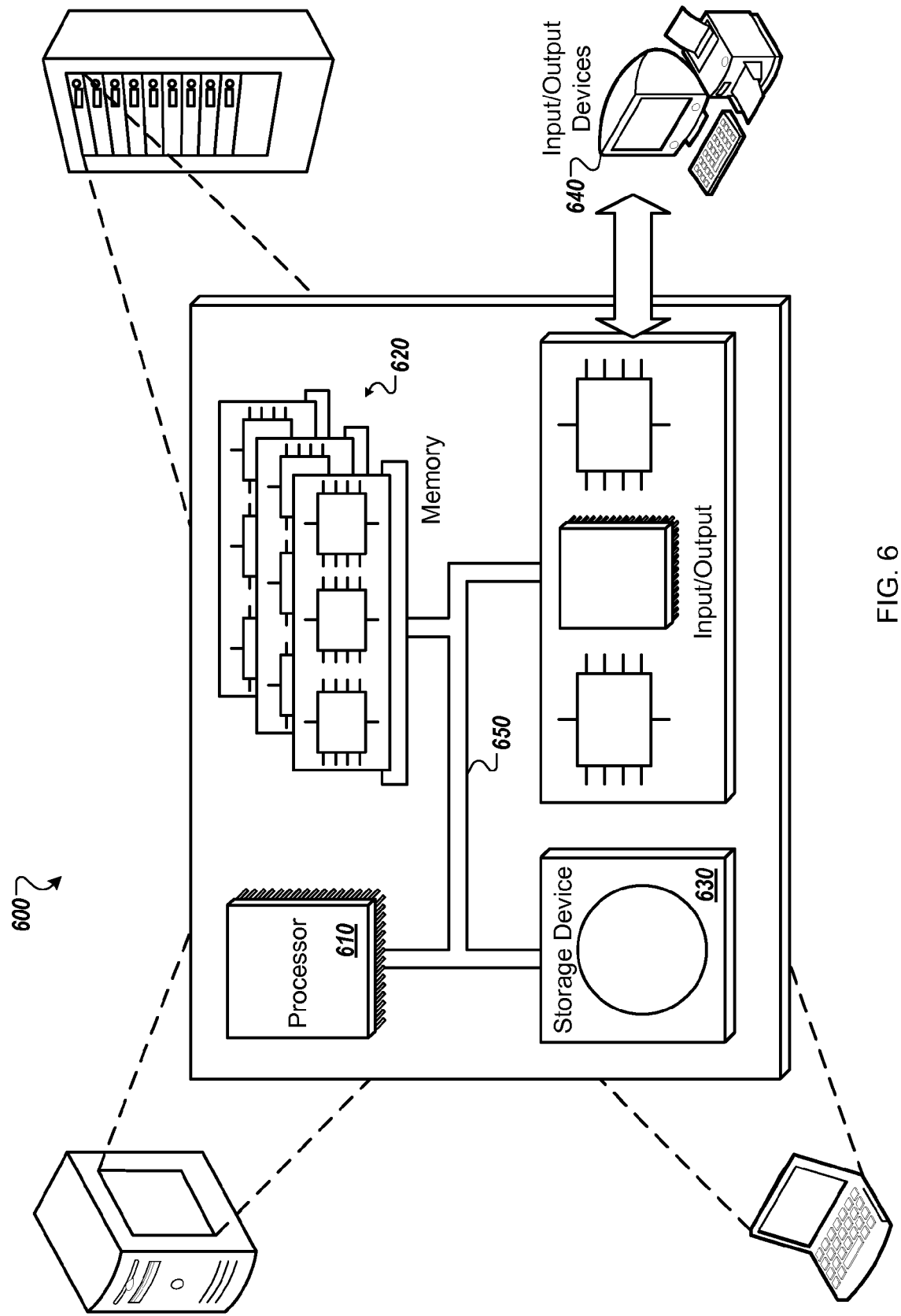
FIG. 6 is a schematic diagram of an example of a generic computer system.

FIG. 6 is a schematic diagram of an example of a generic computer system 600. The system 600 can be used for the operations described in association with the methods 300 and 400, according to one implementation. For example, the system 600 may be included in either or all of the mobile device, manager device, first player, and second player.

The system 600 includes a processor 610, a memory 620, a storage device 630, and an input/output device 640. Each of the components 610, 620, 630, and 640 are interconnected using a system bus 650. Instructions that implement operations associated with the methods described above can be stored in the memory 620 or on the storage device 630. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600, including program instructions. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The storage device can store extractors, pattern matching engines, gadgets, machines, and programs.

The input/output device 640 provides input/output operations for the system 600. In one implementation, the input/output device 640 includes a keyboard and/or pointing device. In another implementation, the input/output device 640 includes a display unit for displaying graphical user interfaces.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be, or can be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
    receiving, in a mobile phone, a first notification from a digital video recorder indicating that the mobile phone is in range of the digital video recorder, wherein the range is based on a distance in which the mobile phone and the digital video recorder can communicate;
    receiving, in the mobile phone, media context information including an identification from the digital video recorder of a recorded program currently being played by the digital video recorder, an elapsed time in the recorded program, type of the recorded program and category of the recorded program;
    receiving, in the mobile phone, a second notification from a computer indicating that the mobile phone is in range of the computer, wherein the mobile phone being in range of the digital video recorder is determined differently than the mobile phone being in range of the computer;
    in response to receiving the second notification, instructing the computer to play the recorded program starting at the elapsed time, and
    periodically receiving the media context information from the digital video recorder, wherein the context information is received from the digital video recorder according to a period based on the recorded program.

2. A method comprising:
    receiving a first notification indicating that a mobile device is in range of a first player device, where the mobile device is distinct from the first player device, wherein the range is based on a distance in which the mobile device and the first player device can communicate;
    receiving media context information, where the media context information identifies media content currently being played by the first player device, where the media content has a timeline, and the media context information specifies a current location in the timeline, type of the media content and category of the media content, wherein the media context information is received from the first player device according to a period based on the media content;
    associating the media context information with the mobile device;
    receiving a second notification indicating that the mobile device is in range of a second player device, where the second player device is distinct from the first player device and the mobile device, and, wherein the mobile device being in range of the first player device is determined differently than the mobile device being in range of the second player device; and
    in response to receiving the second notification, instructing the second player device to begin playing the media content identified in the media context information associated with the mobile device starting from the current location in the timeline.

3. The method of claim 2, wherein the media content identified in the media context information is live content, the method further comprising:
    recording the media content for playback at a later time; and
    sending the recorded media content to the second player device.

4. The method of claim 2, wherein instructing the second player device to begin playing the media content includes sending instructions to the second player device through the mobile device.

5. The method of claim 2, wherein media content is selected from the group consisting of movies, television shows, videos, radio broadcasts, picture slideshows, audio files, music recordings, and video games.

6. A method comprising:
    receiving a first notification indicating that a mobile device is in range of a first player device, where the mobile device is distinct from the first player device, wherein the range is based on a distance in which the mobile device and the first player device can communicate;
    receiving first media context information from the first player device, where the first media context information identifies first media content currently being played by the first player device, type of the first media content and category of the first media content, and where the first media content has the first content type, wherein the first media context information is received from the first player device according to a period based on the first media content;
    associating the first media context information with the mobile device;
    receiving a second notification indicating that the mobile device is in range of a second player device, where the second player device is distinct from the first player device and the mobile device, and, wherein the mobile device being in range of the first player device is determined differently than the mobile device being in range of the second player device;

receiving capability information about the second player device, where the capability information specifies one or more types of media content that can be played by the second player device, and where the first content type is not one of the one or more types of media content that can be played by the second player device;

identifying second media content related to the first media content, where the second media content has a second content type, and where the second content type is one of the one or more types specified by the capability information; and instructing the second player device to play the second media content.

7. The method of claim 6, wherein the first and second media content are played according to a respective timeline, and the first media context information specifies a current location relative to the timeline for the first media content, the method further comprising:

identifying a second location corresponding to the current location based on a mapping of the first media content to the second media content; and wherein instructing the second player device to play the second media content includes instructing the second player device to play the second media content starting from the second location.

8. The method of claim 6, wherein identifying the second media content comprises:

retrieving the second media content from a database associating two or more media contents, each media content having a different type.

9. The method of claim 6, wherein identifying the second media content comprises:

analyzing data for one or more sources of content; and identifying second media content from one of the sources of content, where the second media content is related to the first media content.

10. The method of claim 6, wherein the second media content is related to the first media content when at least one of the following conditions is met:

the first media content and the second media content provide information on the same event; or the first media content and the second media content are related content as determined from user preference data.

11. The method of claim 6, wherein instructing the second player device to begin playing the second media content includes sending instructions to the second player device through the mobile device.

12. A non-transitory computer program product encoded on a computer storage medium device, operable to cause data processing apparatus to perform operations comprising:

receiving, in a mobile phone, a first notification from a digital video recorder indicating that the mobile phone is in range of the digital video recorder, wherein the range is based on a distance in which the mobile phone and the digital video recorder can communicate;

receiving, in the mobile phone, media context information including an identification from the digital video recorder of a recorded program currently being played by the digital video recorder, an elapsed time in the recorded program, type of the recorded program and category of the recorded program;

receiving, in the mobile phone, a second notification from a computer indicating that the mobile phone is in range of the computer, wherein the mobile phone being in range of the digital video recorder is determined differently than the mobile phone being in range of the computer;

in response to receiving the second notification, instructing the computer to play the recorded program starting at the elapsed time; and periodically receiving the media context information from the digital video recorder, wherein the context information is received from the digital video recorder according to a period based on the recorded program.

13. A non-transitory computer program product encoded on a computer storage medium device, operable to cause data processing apparatus to perform operations comprising:

receiving a first notification indicating that a mobile device is in range of a first player device, where the mobile device is distinct from the first player device, wherein the range is based on a distance in which the mobile device and the first player device can communicate;

receiving media context information, where the media context information identifies media content currently being played by the first player device, where the media content has a timeline, and the media context information specifies a current location in the timeline, type of the media content and category of the media content, wherein the media context information is received from the first player device according to a period based on the media content;

associating the media context information with the mobile device; receiving a second notification indicating that the mobile device is in range of a second player device, where the second player device is distinct from the first player device and the mobile device, and, wherein the mobile phone being in range of the first player device is determined differently than the mobile device being in range of the second player device; and in response to receiving the second notification, instructing the second player device to begin playing the media content identified in the media context information associated with the mobile device starting from the current location in the timeline.

14. The computer program product of claim 13, wherein the media content is live content, the computer program further operable to cause data processing apparatus to perform operations comprising:

recording the media content identified in the media context information for playback at a later time; and sending the recorded media content to the second player device.

15. The computer program product of claim 13, wherein instructing the second player device to begin playing the media content includes sending instructions to the second player device through the mobile device.

16. A non-transitory computer program product encoded on a computer storage medium device, operable to cause data processing apparatus to perform operations comprising:

receiving a first notification indicating that a mobile device is in range of a first player device, where the mobile device is distinct from the first player device, wherein the range is based on a distance in which the mobile device and the first player device can communicate;

receiving first media context information from the first player device, where the first media context information identifies first media content currently being played by the first player device, type of the first media content and category of the first media content, and where the first media content has the first content type, wherein the first media context information is received from the first player device according to a period based on the first media content;
associating the first media context information with the mobile device;
receiving a second notification indicating that the mobile device is in range of a second player device, where the second player device is distinct from the first player device and the mobile device, and, wherein the mobile phone being in range of the first player device is determined differently than the mobile device being in range of the second player device;
receiving capability information about the second player device, where the capability information specifies one or more types of media content that can be played by the second player device, and where the first content type is not one of the one or more types of media content that can be played by the second player device;
identifying second media content related to the first media content, where the second media content has a second content type, and where the second content type is one of the one or more types specified by the capability information; and
instructing the second player device to play the second media content.

17. The computer program product of claim 16, wherein the first and second media content are played according to a respective timeline, and the first media context information specifies a current location relative to the timeline for the first media content, the computer program product further operable to cause data processing apparatus to perform operations comprising:
identifying a second location corresponding to the current location based on a mapping of the first media content to the second media content; and
wherein instructing the second player device to play the second media content includes instructing the second player device to play the second media content starting from the second location.

18. The computer program product of claim 16, wherein identifying the second media content comprises:
analyzing data for one or more sources of content; and
identifying second media content from one of the sources of content, where the second media content is related to the first media content.

19. The computer program product of claim 16, wherein instructing the second player device to begin playing the second media content includes sending instructions to the second player device through the mobile device.

20. A system comprising: one or more computers operable to perform operations comprising:
receiving, in a mobile phone, a first notification from a digital video recorder indicating that the mobile phone is in range of the digital video recorder, wherein the range is based on a distance in which the mobile phone and the digital video recorder can communicate;
receiving, in the mobile phone, media context information including an identification from the digital video recorder of a recorded program currently being played by the digital video recorder, an elapsed time in the recorded program, type of the recorded program and category of the recorded program;
receiving, in the mobile phone, a second notification from a computer indicating that the mobile phone is in range of the computer, wherein the mobile phone being in range of the digital video recorder is determined differently than the mobile phone being in range of the computer;
in response to receiving the second notification, instructing the computer to play the recorded program starting at the elapsed time and
periodically receiving the media context information from the digital video recorder, wherein the context information is received from the digital video recorder according to a period based on the recorded program.

21. A system comprising: one or more computers operable to perform operations comprising:
receiving a first notification indicating that a mobile device is in range of a first player device, where the mobile device is distinct from the first player device, wherein the range is based on a distance in which the mobile device and the first player device can communicate;
receiving media context information, where the media context information identifies media content currently being played by the first player device, where the media content has a timeline, and the media context information specifies a current location in the timeline, type of the media content and category of the media content, wherein the media context information is received from the first player device according to a period based on the first media content;
associating the media context information with the mobile device;
receiving a second notification indicating that the mobile device is in range of a second player device, where the second player device is distinct from the first player device and the mobile device, and, wherein the mobile phone being in range of the first player device is determined differently than the mobile device being in range of the second player device; and
in response to receiving the second notification, instructing the second player device to begin playing the media content identified in the media context information associated with the mobile device starting from the current location in the timeline.

22. The system of claim 21, wherein the media content identified in the media context information is live media content, the system further operable to perform operations comprising:
recording the media content for playback at a later time; and
sending the recorded media content to the second player device.

23. The system of claim 21, wherein the one or more computers comprise a server operable to interact with the mobile device through a data communication network, and the mobile device is operable to interact with the server as a client.

24. A system comprising: one or more computers operable to perform operations comprising:
receiving a first notification indicating that a mobile device is in range of a first player device, where the mobile device is distinct from the first player device, wherein the range is based on a distance in which the mobile device and the first player device can communicate;
receiving first media context information from the first player device, where the first media context information identifies first media content currently being played by the first player device, type of the first media content and category of the first media content, and where the first media content has the first content type, wherein the first media context information is received from the first player device according to a period based on the first media content;

associating the first media context information with the mobile device;

receiving a second notification indicating that the mobile device is in range of a second player device, where the second player device is distinct from the first player device and the mobile device, and, wherein the mobile phone being in range of the first player device is determined differently than the mobile device being in range of the second player device;

receiving capability information about the second player device, where the capability information specifies one or more types of media content that can be played by the second player device, and where the first content type is not one of the one or more types of media content that can be played by the second player device;

identifying second media content related to the first media content, where the second media content has a second content type, and where the second content type is one of the one or more types specified by the capability information; and instructing the second player device to play the second media content.

25. The system of claim 24, wherein the first and second media content are played according to a respective timeline, and the first media context information specifies a first location relative to the timeline for the first media content, the method further comprising:

identifying a second location corresponding to the first location based on a mapping of the first media content to the second media content; and wherein instructing the second player device to play the second media content includes instructing the second player device to play the second media content starting from the second location.

26. The system of claim 24, wherein identifying the second media content comprises:

analyzing data for one or more sources of content; and identifying second media content from one of the sources of content, where the second media content is related to the first media content.

27. The system of claim 24, wherein the one or more computers comprise a server operable to interact with the mobile device through a data communication network, and the mobile device is operable to interact with the server as a client.

* * * * *